ial Patent [15] 3,646,956
[45] Mar. 7, 1972

[54] RADIAL FLOW CHECK VALVE

[72] Inventor: Adair Rogers, Harts Lane, Conshohocken, Pa. 19428

[22] Filed: Mar. 18, 1970

[21] Appl. No.: 20,536

[52] U.S. Cl. ...........................................................137/525
[51] Int. Cl. ...........................................................F16k 15/14
[58] Field of Search ................137/525, 454.2, 454.4, 454.5, 137/454.6, 155

[56] References Cited

UNITED STATES PATENTS

| | | | |
|---|---|---|---|
| 3,042,065 | 7/1962 | Graves | 137/155 |
| 3,223,109 | 12/1965 | Cummings | 137/155 |
| 3,395,728 | 8/1968 | Tamplen | 137/525 |

*Primary Examiner*—Laverne D. Geiger
*Assistant Examiner*—William H. Wright
*Attorney*—Jackson, Jackson and Chovanes

[57] ABSTRACT

A radial flow check valve having radially displaced annular inlet and discharge passages, an annular sealing wall between the inlet and discharge passages extending generally transverse to the axis, and an annular symmetrical elastomeric membrane secured at one edge to the body, when closed engaging the sealing wall at the other and movable edge of the membrane, and separating the inlet and discharge passages, having a web intermediate between its ends which in cross section is convex on the side toward the inlet passage, the movable edge of the membrane opening away from the sealing wall in a generally axial direction. In the preferred form the membrane has at the movable edge an annular lip extending toward the discharge passage and which may contain a metallic support ring. Also in the preferred form there is an annular vortex pocket located adjoining the side of the membrane which exerts closing force, the vortex pocket connecting at one side with the discharge passage by an annular opening, and the discharge passage extending directly from the space between the movable edge of the membrane and the sealing wall when the membrane is open. In the preferred form the membrane at rest conforms to the position which it assumes when the check valve is closed. The membrane may be clamped between separate parts of the body. In axial length the discharge passage is preferably between 0.5 and 1.5 times the distance of full opening of the check valve. In one form, the inlet and discharge passages are led from axial connecting passages.

14 Claims, 4 Drawing Figures

INVENTOR.
ADAIR ROGERS

ATTORNEYS.

INVENTOR.
ADAIR ROGERS

RADIAL FLOW CHECK VALVE

DISCLOSURE OF INVENTION

The present invention relates to radial flow check valves suitable for fluids, including liquids and gases, and adaptable for use on a large variety thereof including water, steam, chemical liquids and gases, solvents, petroleum, suspensions, and non-Newtonian fluids and the like.

A purpose of the invention is to separate radially concentric inlet and discharge passages by an elastomeric membrane of annular shape secured at one edge in the valve body and having a movable edge which closes against an annular sealing wall generally transverse to the axis and opening away from such sealing wall.

A further purpose is to provide a membrane having in cross section a web which is convex in the direction toward the inlet, the membrane flexing slightly when the valve opens.

A further purpose is to provide, at the movable end directed toward the discharge passage of the membrane, a lip which contains a strong ring insert capable of supporting the membrane in tension (or compression for certain valve configurations) when an increasing pressure differential develops across the closed check valve.

A further purpose is to strengthen the lip by a support ring so that the membrane will open and close symmetrically around the circumference.

A further purpose is to initially mold or shape the elastomeric membrane so that it will when relaxed assume the contour which it assumes when the valve is closed without any substantial differential pressure between the inlet and discharge passages.

A further purpose of the invention is to aid in closing the check valve when flow develops between the inlet and the discharge. An annular vortex pocket in contact with one side of the membrane and connecting by an annular passage within the discharge passage generates a vortex within the pocket by peeling off a portion of the flow volume into the vortex pocket, thereby creating a differential pressure as a result of the angular rotation generated within the vortex. The pressure differential will tend to cause the check valve to close. Thus as the velocity of flow diminishes, there will be a positive pressure differential tending to close the valve created by the vortex, which will remain until the energy of the vortex is dissipated.

A further purpose is to design a check valve in which the closing response is accurately proportional to flow.

Further purposes appear in the specification and claims.

In the drawings I have chosen to illustrate a few only of the numerous embodiments in which the invention may appear, selecting the forms shown from the viewpoints of convenience in illustration, satisfactory operation, and clear demonstration of the principles involved.

In the prior art, numerous forms of check valves are available including ball, disc, plunger, flap and other such devices. Some of them are inefficient from the standpoint of checking reverse flow in that they lag in closing and allow an undesirable amount of reverse flow to take place. Others are expensive, overelaborate and cumbersome. Still others subject the valve element to forces which may cause damage and require early replacement.

The present check valve is designed to give a closing response which is accurately proportional to flow. It is efficient in that it closes promptly at or before the time when a pressure differential or pressure surge would otherwise cause backflow. One important feature of the valve of the invention is that it opens and closes symmetrically. By virtue of the ringlike character of the space through which flow takes place, a relatively small valve has high capacity, but at the same time will reliably close with the cessation of flow and on the presence of back pressure.

An important feature of the valve of the invention is that part of the kinetic flow energy enters an annular vortex pocket by a ringlike side passage and there is converted as a result of angular rotation into a differential pressure which acts against the membrane to close the valve.

An important aspect of the invention from the standpoint of high service life of the membrane is that the side of the membrane exposed to the inlet pressure is in cross section convex both when the membrane is open and when it is closed, so that the force applied to the membrane in opening results in a minimum amount of flexure uniformly distributed and the membrane in its normally closed position will be in tension and substantially free from flexure stress.

At the moving end of the membrane a bulbous lip is provided, and this may be strengthened and stiffened by a ring suitably of metal desirably molded in the lip which tends to prevent warping of the membrane into a nonsymmetrical shape, and supports the hydraulically induced tensile loads on the membrane when the membrane is closed.

Figure 1:
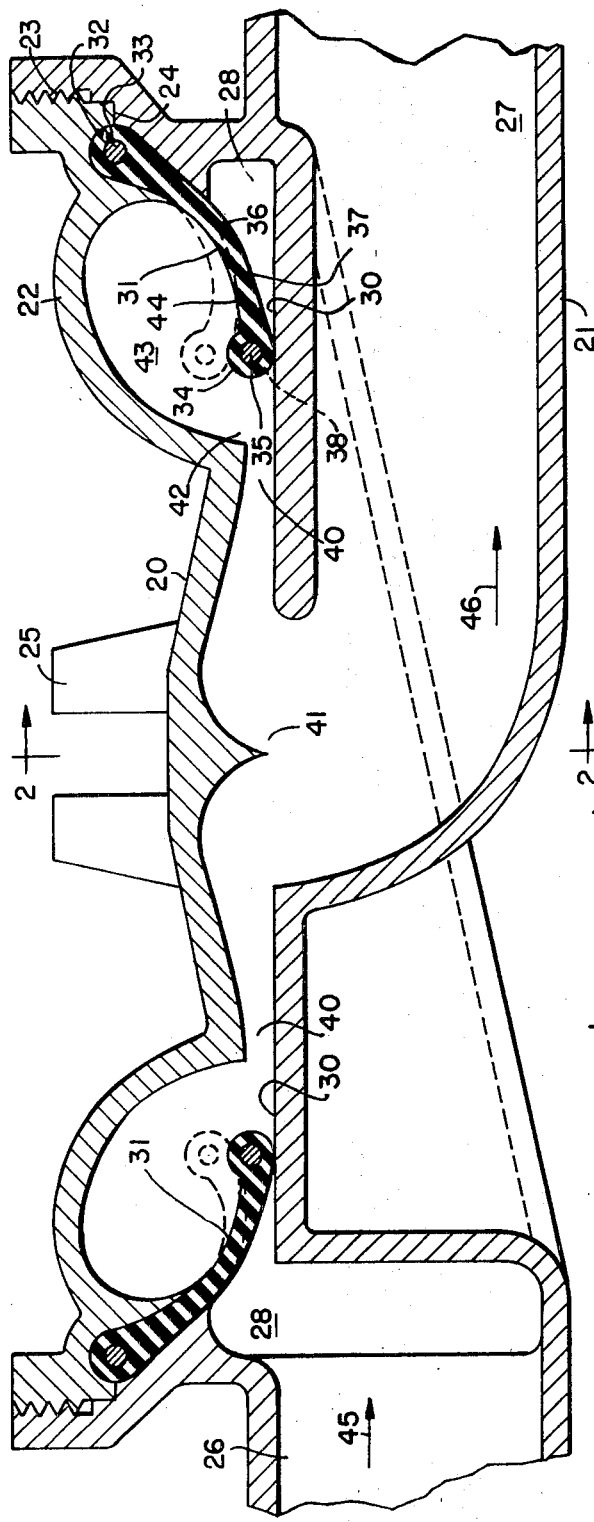
FIG. 1 is a central axial section through the preferred check valve of the invention in the embodiment designed for flow radially inward, showing in dotted lines the position of the valve membrane when the valve is open.
Figure 2:
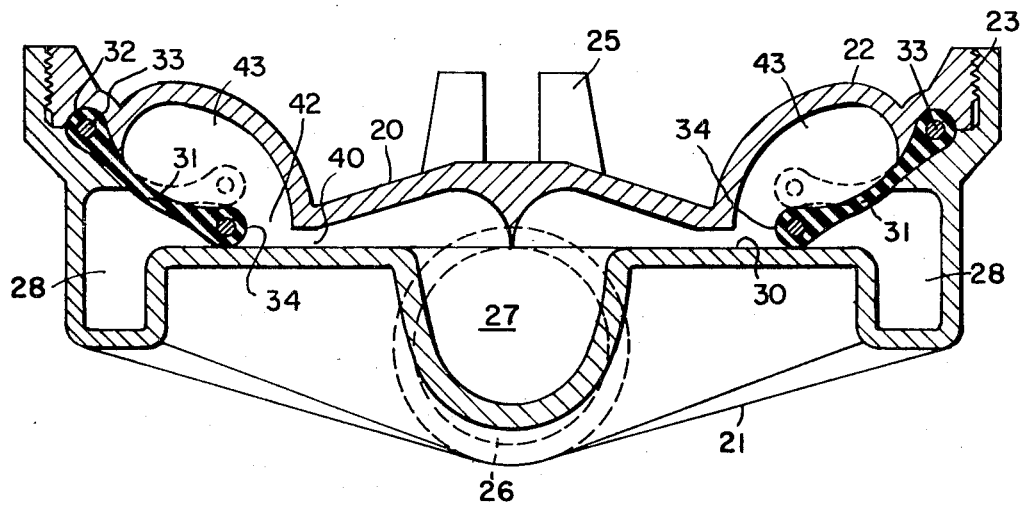
FIG. 2 is a section of the valve of FIG. 1, on the line 2—2 of FIG. 1.

Referring to FIGS. 1 and 2, the preferred check valve there shown is designed for radial inward flow. A body 20 consists of a main body part 21 and a cover 22 which are interthreaded at 23 and sealed because of the anchorage of the membrane to be described. To avoid excess sealing pressure, the cover 22 seats at 24. Wrench lugs are provided at 25 to aid in disassembly.

The body has an inlet connection 26 which is desirably provided with a pipe fitting not shown, and a discharge connection 27 which is provided with a pipe fitting, not shown. Aside from these connections 26 and 27 the body is symmetrical about the plane determined by the Y-axis and the inflow-outflow axis.

The inlet connection 26 communicates with an annular symmetrical inlet passage 28 which adjoins a sealing wall 30 which extends generally at right angles to the axis of the valve.

An elastomeric membrane 31 is of ringlike form suitably molded so that in the preferred embodiment in rest or relaxation it has the shape shown in full lines in FIG. 1 (closed). The membrane has at its outer edge a bulbous annular lip 32 which may be supported by molding therein a metallic ring 33 suitably of steel, stainless steel or aluminum. At the inner edge the membrane has a bulbous annular lip 34 which may be further stiffened by a metallic ring 35 molded in it, suitably of steel, stainless steel or aluminum. Between the edges there is an annular web 36 which has a convex surface 37 facing toward the inlet passage 28.

It will be noted that the membrane has a dished shape, since the lip 32 is displaced axially of the valve with respect to the lip 34.

The body parts receive and clamp the outer lip 32 and the adjoining portion of the web 36 so that the membrane in effect is a seal or gasket for the valve.

The membrane is completely symmetrical in cross section and in opening and closing moves symmetrically throughout the circumference.

In closing, the membrane engages the sealing wall 30 of the body and in opening the movable bulbous lip 34 moves in a generally axial direction to open the valve as shown by the dotted lines. The valve opening is thus a ringlike area 38 between the lip 34 and the sealing wall 30.

Immediately inward of the valve membrane there is an annular radial discharge passage 40 which preferably has an opening between 0.5 and 1.5 times the full opening 38 of the valve. The annular discharge passage 40 widens into and communicates with discharge port 27 through a central opening 41.

Immediately to the side of the discharge passage 40 away from the sealing wall 30 there is an annular entrance 42 into an annular vortex pocket 43 which lies along the side of the membrane 31 which is concave at 44. As shown the cross section of the vortex pocket is generally oval, and it preferably has a width which is between four and eight times the axial opening of the valve and a length between four and 12 times the axial opening of the valve. The function of the vortex pocket is to convert the kinetic energy of a portion of the flow past the valve into a positive differential pressure across the membrane as a result of the angular rotation imparted to the fluid by the shape of the vortex pocket. The entrance 42 to the vortex pocket preferably has dimensions about one to three times the valve opening.

The body will suitably be made of a valve body material, which may be a metal or alloy such as stainless steel, bronze, steel or aluminum, or a suitable plastic such as phenol formaldehyde plastic. The membrane is made of a suitable elastomer which will be selected particularly to avoid deterioration in the presence of the fluid which is transmitted through the valve. The membrane may generally be made of elastomeric silicone rubber, neoprene, GRS, Buna-n polyethylene, polypropylene, or polyvinyl chloride. The thickness and thinness of the membrane can be adjusted accordingly to the operating pressure differential so that the membrane will sustain the pressure.

While it is preferred to mold the membrane so that it normally achieves the shape of the membrane when the valve is closed, residual stress or bias can be introduced into the membrane by molding the membrane in a different contour. It will also be evident that the extent of squeezing of the fixed end of the membrane and the shape of the gripping surface may if desired give the membrane a bias toward opening or closing as desired.

While in the preferred embodiment it is intended to have the membrane convex toward the inlet side, and this cooperates with the desired concavity on the side of the vortex pocket, it will be evident that the web of the membrane may in certain cases have a different contour. From the standpoint, however, of service life of the membrane it is desired to have the membrane subject to minimum flexure in opening and to pure tension when closed.

In operation of the check valve of FIGS. 1 and 2, it will be evident that during a time when the inlet pressure is greater than the discharge pressure, inlet flow takes place as suggested by arrow 45 through the inlet connection 26 and around the inlet passage 28 and then through the valve-opening space 38 between the membrane 31 and the sealing surface 30. This flow then continues through the discharge passage 40, the opening 41 and the discharge connection 27 as suggested by arrow 46.

Part of the flow past the valve tip is peeled off by the lip of the vortex pocket forming a rapidly revolving vortex within the pocket, thereby producing a positive pressure differential on the valve membrane discharge side tending to close the open valve. With the reduction of the rate of flow across the valve, the membrane will continue to experience a positive pressure differential on the discharge side, gradually declining as the vortex energy declines to the energy level of the reduced flow rate. The more rapidly the flow is reduced, the greater the momentary positive pressure differential which exists as a result of the continuing fluid rotation within the vortex.

Figure 3:
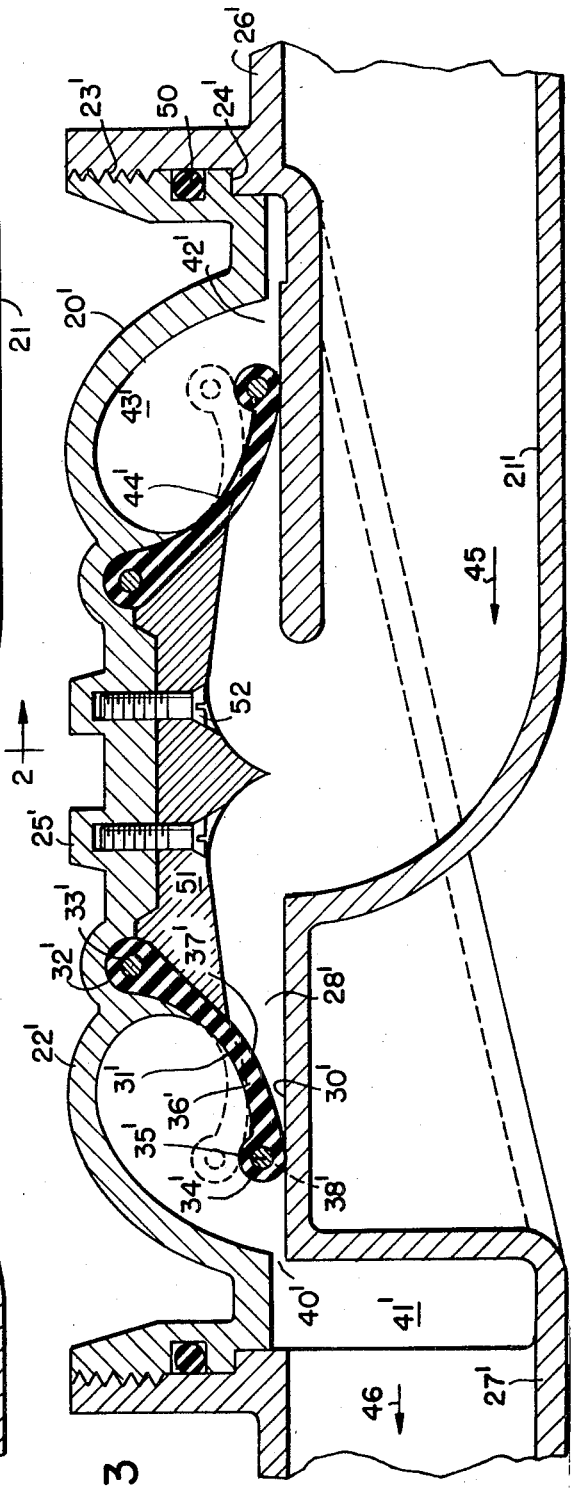
FIG. 3 is a central axial section of a modified check valve of the invention, showing the form in which the flow is radially outward, illustrating the position of the membrane when the valve is open by dotted lines.

FIG. 3 is a substantial reversal of the form of FIGS. 1 and 2. In the form of FIG. 3, a body 20' consists of a main body part 21' and a cover 22' which are interthreaded at 23' and sealed by an O-ring 50. The cover seats in the main body part at 24'. Wrench lugs are provided at 25' to aid in disassembly.

The body has an inlet connection 26' desirably provided with a pipe fitting not shown and a discharge connection 27' which is provided with a pipe fitting not shown. Aside from these connections the body is symmetrical around the inlet-outlet axis. The inlet connection 26' communicates with an annular symmetrical inlet passage 28' which adjoins a sealing wall 30' which extends generally at right angles to the axis of the valve.

An elastomeric membrane 31' is of ringlike form suitably molded so that in the preferred embodiment in rest or relaxed position it has the shape shown in full lines in FIG. 1 (closed). The membrane has at its inner edge a bulbous annular lip 32' which is supported by molding therein a metallic ring 33'. At the outer edge the membrane has a bulbous annular lip 34' which is supported by a metallic ring 35' molded in it. Between the edges there is an annular web 36' which has a convex surface 37' facing toward the inlet passage 28'.

In the form of FIG. 3, the membrane has a dish shape, since the lip 32' is displaced axially of the valve with respect to the lip 34'. The inner lip 32' is clamped along with the adjoining portion of web 36' between a membrane clamp 51 and the cover 22' by screws 52. This serves as a gasket to seal at the fixed end of the membrane against leakage.

The membrane 31' is completely symmetrical in section and in opening and closing moves symmetrically throughout the circumference.

In closing, the membrane engages the sealing wall 30' of the body and in opening the movable bulbous lip 34' moves in a generally axial direction to open the valve as shown by the dotted lines. The valve opening is thus a ringlike area 38' between the lip 34' and the sealing wall 30'. Immediately radially outward of the valve membrane there is an annular radial discharge passage 40' which is a reversal of the device shown in FIG. 1 and which widens into and communicates with an annular discharge opening 41' which communicates with discharge connection 27'.

Immediately to the side of the discharge passage 40' away from the sealing wall 30' there is an annular entrance 42' into an annular vortex pocket 43' which lies along the side of the membrane which is concave at 44'. The design and dimensions of the vortex pocket are suitably as described in connection with FIG. 1.

The respective materials used for the body and the membrane are conveniently the same as those described in connection with FIG. 1.

In operation the device of FIG. 3 operates effectively the same way as the device of FIGS. 1 and 2 except that what is described in FIGS. 1 and 2 as a radial inward flow is in the device of FIG. 3 a radial outward flow, and what is described in FIGS. 1 and 2 as a radial outward flow is in the device of FIG. 3 a radial inward flow.

Figure 4:
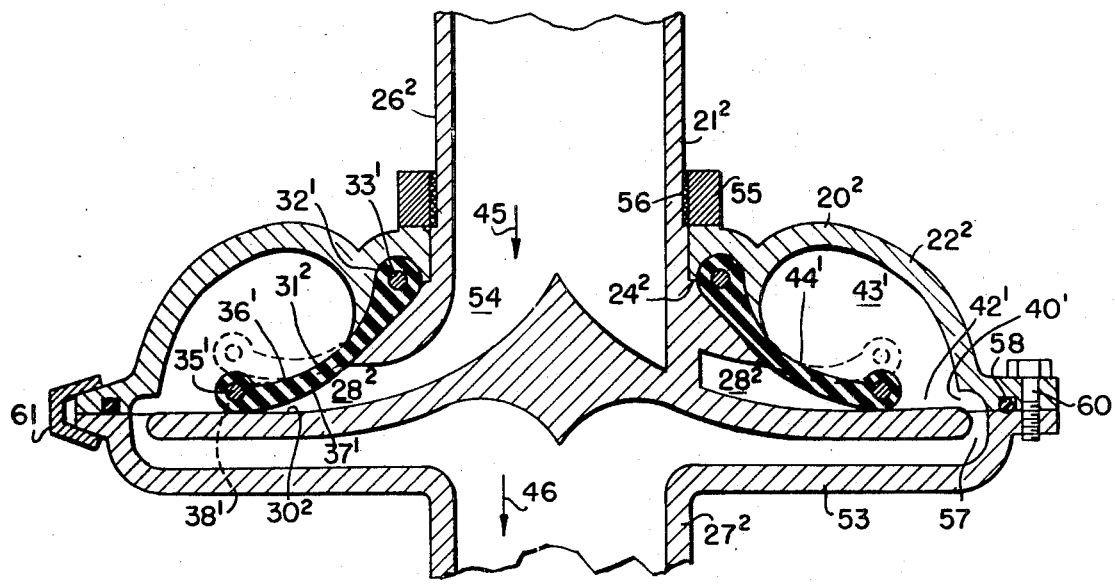
FIG. 4 is a central axial section through a device of the invention having axial connecting inlet and discharge passages, showing the valve in open position in dotted lines.

FIG. 4 is a variation of the device shown in FIG. 3 which leads the inlet and discharge connections axially. The body $20^2$ consists of a main body part $21^2$, a cover $22^2$ and a discharge connection portion 53. The main body part $21^2$ has an axial inlet connection $26^2$, which communicates through an opening 54 with an annular inlet passage $28^2$ in contact with the convex side of the membrane. The membrane is sealed and supported in an annular space between the main body portion $21^2$ and the cover $22^2$ by a nut 55 engaging threads 56 on the main body part $21^2$, compressing the membrane and urging the parts of the body against a shoulder $24^2$.

The vortex chamber and the sealing wall are arranged as shown in FIG. 3 and at the discharge side the annular discharge passage 40' communicates with a reverse inward flow annular passage 57 which communicates with an axial discharge connection $27^2$. A discharge portion 53 of the valve body is sealed by an O-ring 58 and the cover $22^2$ and the discharge part 53 are held together either by screws 60 or clips 61 as desired.

The operation of the device shown in FIG. 4 is substantially the same as the operation of the device shown in FIG. 3.

In view of my invention and disclosure, variations and modifications to meet individual whim or particular need will doubtless become evident to others skilled in the art, to obtain all or part of the benefits of my invention without copying the structure and method shown, and I therefore claim all such insofar as they fall within the reasonable spirit and scope of my claims.

Having thus described my invention, what I claim as new and desire to secure by Letters Patent is:

1. A radial flow check valve having a body, radially displaced coaxial annular inlet and discharge passages in the body, an annular sealing wall in the body located between the inlet and discharge passages and extending generally transverse to the axis, and an annular symmetrical elastomeric membrane secured at one edge in the body, when closed engaging the sealing wall at the other and movable edge of the membrane and separating the inlet and discharge passages, having an annular web intermediate its edges which in cross section is convex on the side toward the inlet passage, the movable edge of the membrane opening away from the sealing wall in a generally axial direction, having at the movable edge of the membrane an annular lip extending toward the discharge passage and having a support ring extending through the interior of the lip.

2. A valve of claim 1, in which in closed position the edge of the membrane secured to the body is displaced from the plane of the sealing wall farther than the movable edge of the membrane.

3. A check valve of claim 2, in which the inlet passage is located toward the radial outside with respect to the discharge passage.

4. A check valve of claim 2, in which the inlet passage is located toward the radial inside with respect to the discharge passage.

5. A check valve of claim 2, in which the inlet passage connects with a coaxial inlet connection and the discharge passage connects with a coaxial discharge connection.

6. A valve of claim 2, having an annular vortex pocket located in the body adjoining the side of the membrane at which closing force is applied, said vortex pocket connecting at one side with the discharge passage through an annular opening.

7. A check valve of claim 1, having an annular vortex pocket located in the body adjoining the side of the membrane at which closing force is exerted, said vortex pocket being connected at one side with the discharge passage through an annular opening.

8. A check valve of claim 7, in which the discharge passage has an axial length of between 0.5 and 1.5 times the axial distance of full opening of the valve.

9. A check valve of claim 1, having an annular vortex pocket located adjoining the side of the membrane at which closing force is exerted and the annular discharge passage extending directly from the space between the movable end of the membrane and the sealing wall when the membrane is open radially along the sealing wall and open to the vortex pocket at the side remote from the sealing wall by an annular opening.

10. A check valve of claim 1, in which the membrane when at rest assumes the shape which it has when the valve is closed.

11. A check valve of claim 1, having at the edge of the membrane secured in the body an annular lip, parts of the body being separable for replacement of the membrane.

12. An annular symmetrical elastomeric membrane having radially inner and outer edges which are of different diameters, having at one of these edges an annular lip and having an annular web between the edges which is convex upon one side and concave on the other side, the two edges of the membrane being relatively displaced along the axis and having a support ring extending through said lip.

13. A membrane of claim 12, having annular lips at both inner and outer edges and support rings extending through both lips.

14. A method of closing a check valve having an annular membrane one edge of which is fixed and the other edge of which is movable, and having in cross section a web between the edges, one side of which is convex and one side of which is concave, which comprises conducting a part of the flow from the discharge side into an annular vortex pocket against the concave side and there converting the kinetic energy of part of the flow into differential pressure.

* * * * *